(12) United States Patent
Giles et al.

(10) Patent No.: US 7,340,168 B2
(45) Date of Patent: *Mar. 4, 2008

(54) SYSTEM AND METHOD FOR OPTICALLY LABELED PACKET TRANSMISSION

(75) Inventors: Randy Clinton Giles, Whippany, NJ (US); Xiang Liu, Marlboro, NJ (US); Yikai Su, Palatine, IL (US); Xing Wei, New Providence, NJ (US)

(73) Assignee: Lucent Technologies Inc., Murray Hill, DE (US)

( * ) Notice: Subject to any disclaimer, the term of this patent is extended or adjusted under 35 U.S.C. 154(b) by 506 days.

This patent is subject to a terminal disclaimer.

(21) Appl. No.: 10/673,701

(22) Filed: Sep. 29, 2003

(65) Prior Publication Data

US 2005/0069329 A1    Mar. 31, 2005

(51) Int. Cl.
*H04J 14/00*    (2006.01)
*H04B 10/02*    (2006.01)

(52) U.S. Cl. .............................. 398/47; 398/51; 398/54; 398/185

(58) Field of Classification Search ................. 398/47, 398/51–54, 74, 75, 185
See application file for complete search history.

(56) References Cited

U.S. PATENT DOCUMENTS 6,626,589 B1 * 9/2003 Epworth .................... 398/54
2002/0071152 A1 * 6/2002 Blumenthal ................ 359/123
2003/0198478 A1 * 10/2003 Vrazel et al. ............... 398/183

FOREIGN PATENT DOCUMENTS

EP    1 113 695 A2    10/2000

OTHER PUBLICATIONS

Chi et al., "Transmission Performance of All-optically labelled Packets using ASK/DPSK Orthogonal Modulation", 2002, IEEE.*
T. Koonen et al., "Optical Packet Routing in IP-Over-WDM Networks Deploying Two-Level Optical Leveling", *Proc. 27th Eur. Conf. on Opt. Comm. (ECOC'01—Amsterdam)*, pp.608-609, paper Th.L.2.1.
Walklin et al., "Multilevel Signaling For Increasing The Reach of 10 Gb/s Lightwave Systems", *Journal of Lightwave Technology*, vol. 17, No. 11, pp. 2235-2248 (1999).
M. Ohm et al., "Quaternary Optical ASK-DPSK And Receivers With Direct Detection", *IEEE Photonics Technology Letters*, vol. 15, No. 1, Jan. 2003, pp. 159-161.
C. Xu et al., "Postnonlinearity Compensation With Data-Driven Phase Modulaors In Phase-Shift Keying Transmission", *Optics Letters*, vol. 27, No. 18, Sep. 15, 2002, pp. 1619-1621.
X. Liu et al., "Improving Transmission Performance In Differential Phase-Shift-Keyed Systems By Use of Lumped Nonlinear Phase-Shift Compensation", *Optics Letters*, vol. 27, No. 18, Sep. 15, 2002, pp. 1616-1618.

(Continued)

*Primary Examiner*—Dalzid Singh (57) ABSTRACT

A system and method for transmitting optically labeled packets using DPSK/ASK modulation. The system comprises a transmitter including at least two modulators adapted to provide DPSK modulation of a payload portion of optically labeled packets and ASK modulation for a label portion of the optically labeled packets. A receiver is also provided which includes a balanced detector for detection of the payload portion of the optically labeled packets.

17 Claims, 5 Drawing Sheets

OTHER PUBLICATIONS

R. A. Griffin et al., "Optical Differential Quadrature Phase-Shift Key (oDQPSK) For High Capacity Optical Tranwsmission", *Proceedings of OFC 2002,* (2002) pp. 367-368.

X. Liu et al., Quaternary Differential-Phase Amplitude-Shift-Keying For DWDM Transmission, *ECOC'03,* Paper Th2.6.5.

J. Conradi, *Optical Fiber Telecommunications IVB,* Chap. 16, Academic Press (2002).

T. Koonen et al., "Optical Labeling Of Packets In IP-Over-WDM Networks", *ECOC'02,* Sep. 2002, paper 5.5.2.

D.J. Blumenthal et al., "All-Optical Label Swapping Networks And Technologies", *Journal of Lightwave Technology,* vol. 18, No. 12, pp. 2058-2075 (2000).

N. Chi et al., "Transmission And Transparent Wavelength Conversion Of An Optically Labeled Signal Using ASK/DPSK Orthogonal Modulation", *IEEE Photonics Technology Letters,* vol. 15, pp. 760-762 (2003).

X. Liu et al. "Optical-Label Switching Based On DPSK/ASK Modulation Format With Balanced Detection for DPSK Payload", *ECOC'03.*

N. Chi et al., "Transmission and Label Encoding/Erasure Of Orthogonally Labelled Signal Using 40 Gbit/s RZ-DPSK Payload and 2.5 Gbit/s IM Label", *Electronics Letters,* vol. 39, No. 18, Sep. 4, 2003.

U.S. Appl. No. 10/331,217, filed Dec. 30, 2002, Liu et al.

* cited by examiner

SYSTEM AND METHOD FOR OPTICALLY LABELED PACKET TRANSMISSION

FIELD OF THE INVENTION

The present invention relates generally to optically labeled packet transmission, and more specifically to a system and method for transmitting optically labeled packets to allow for optical-label packet switching.

BACKGROUND OF THE INVENTION

Optical packet switching is an attractive technology that enables more effective and flexible utilization of the capacity of WDM optical networks by providing sub-wavelength granularity. Optical-label switching, as one of the promising packet switching schemes, offers several key features that are important to future data-intensive networks. These features include protocol and format independent transparency at the all-optical data plane, simplification in the control plane, and interoperability with legacy and emerging networking technologies including GMPLS. Such a switching scheme is discussed in D. J. Blumenthal, et al., "All-Optical Label Swapping Networks and Technologies", Journal of Lightwave Technologies, Vol. 18, No. 12, pp. 2058-2075 (2000), which is incorporated herein by reference.

Optical-label packet transmission schemes have been proposed in which a packet payload is carried using amplitude-shift-keying (ASK) modulation and the packet label is carried using differential-phase-shift-keying (DPSK) modulation. Such an optical label generation scheme is discussed in N. Chi et al., "Transmission and Transparent Wavelength Conversion of an Optically Labeled Signal Using ASK/DPSK Orthogonal Modulation", IEEE Photonics Technology Letters, Vol. 15, pp. 760-762 (2003), which is incorporated herein by reference. Receiver sensitivities with an optical pre-amplifier (at BER=$10^{-9}$) of $\sim$−26 dBm and −30 dBm were obtained for a 10-Gb/s ASK payload and a 2.5-Gb/s DPSK label, respectively.

Prior art schemes, such as the one proposed by N. Chi et al., which use DPSK modulation to carry the low-speed label information and ASK to carry the high-speed payload information, have a number of drawbacks. First, since DPSK modulation is used to carry low-speed label information, the delay interferometer, needed in DPSK demodulation, has a long delay difference between the two arms of the delay interferometer, and thus, it is very temperature sensitive and polarization sensitive. Secondly, any change in the data rate of the label requires a change of the delay interferometer (to obtain a matched delay). Thirdly, the removal and insertion of packet labels is difficult since the label is phase modulated. To remove a label, Chi et al. propose the use of cross-gain modulation, which will change the signal wavelength. This is not be desirable for cases where signal wavelength needs to be maintained. To add a label, expensive phase-sensitive modulation is required. Finally, low-speed DPSK requires a high-coherence (low bandwidth) source (CW) laser and is less tolerant to non-linear effects such as cross-phase-modulation (XPM).

SUMMARY OF THE INVENTION

The present invention provides a system and method for transmitting optically labeled packets using DPSK/ASK modulation. In a preferred embodiment, a system is provided comprising a transmitter including at least two modulators adapted to provide DPSK modulation of a payload portion of optically labeled packets and ASK modulation for a label portion of the optically labeled packets. The system may further include a receiver containing a balanced detector for detection of the payload portion of the optically labeled packets.

In a preferred embodiment of a method according to the invention, a communication method for transmission of optically labeled packets is provided comprising the step of modulating light from a laser source using DPSK modulation to carry payload information and ASK modulation to carry label information.

DETAILED DESCRIPTION OF THE INVENTION

In preferred embodiments of the present invention, a system and method are provided which use a DPSK/ASK modulation format to carry payload/label information, and which use balanced detection for the DPSK payload portion of a DPSK/ASK signal. The present invention offers a number of advantages over prior art schemes. First, DPSK is used to carry a high-speed payload, so the temperature stability of a delay-line interferometer (used in DPSK demodulation) is significantly improved, and its polarization sensitivity is significantly reduced, due to the reduced relative delay between the two arms of the interferometer. Second, the data rate of the label can be adjusted (e.g., from 2.5-Gb/s to 155-Mb/s) without changing the interferometer. Third, the use of a balanced receiver can not only improve the tolerance of a DPSK receiver to packet power fluctuations, but can also substantially increase the DPSK receiver sensitivity (e.g., by about 3 dB) as well as the ASK receiver sensitivity (by allowing a higher extinction ratio for ASK modulation). Fourth, the removal and insertion of a label is substantially easier since it is intensity modulated (as opposed to phase modulated).

Figure 1:
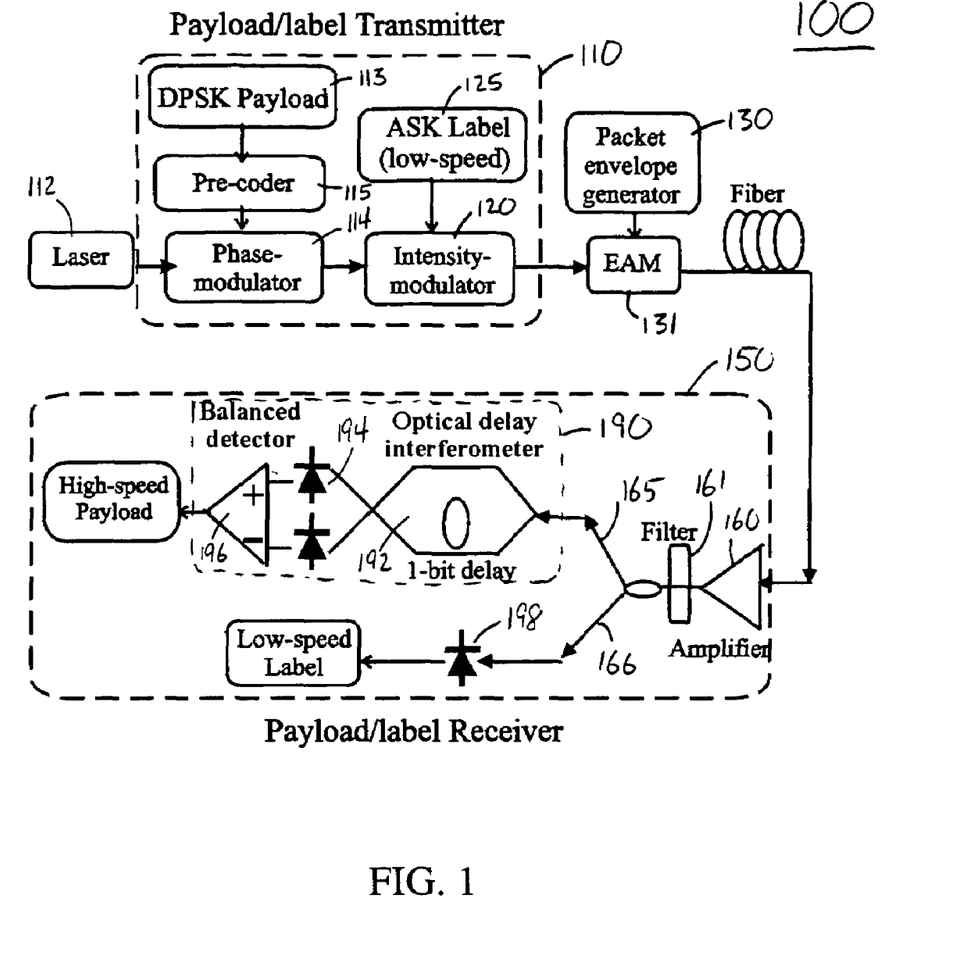
FIG. 1 is a diagram depicting one embodiment of a system according to the invention.

One embodiment of a system 100 according to the invention is illustrated in FIG. 1. The system 100 preferably includes a DPSK/ASK transmitter 110, and a DPSK/ASK receiver 150. In operation, the light from a laser 112 is DPSK modulated using payload data signal 113 to drive a phase modulator 114. Preferably the payload data signal 113 is a high speed signal having a data rate of greater than about 2.5 Gb/s.

The phase modulator 114 may be a single-waveguide phase modulator, a Mach Zehnder (MZM), or the like. The MZM can be made from a variety of electro-optic materials, for example, $LiNbO_3$, and is preferably biased at its null point and driven at $\sim 2V_\pi$ to switch the phase of the light signal between 0 and $\pi$. A chirp-free MZM is preferably employed to produce a DPSK signal with substantially perfect phase values (0 and $\pi$). Preferably, an encoder 115 is used to perform DPSK encoding prior to phase modulation.

An intensity modulator 120 is coupled to the phase modulator 114 to provide ASK modulation of the light from the laser 112. The intensity modulator 120 is preferably driven by an ASK label data signal 125. The ASK label data signal is preferably a low speed signal having a data rate of less than about ¼ of the payload data rate. Preferably, the intensity modulator 120 is driven to produce a low extinction ratio (ER) of between about 2 dB and about 8 dB. The intensity modulator 120 can be a MZM, an electro-absorption modulator (EAM), or the like. For a MZM, a low ER can be achieved by under-driving the MZM and shifting the bias point away from the quadrature point. For modulation with an EAM, a low ER can be achieved by shifting the bias point.

It can be understood by those skilled in the art that the order of the DPSK payload modulation and the ASK label modulation of the laser light may be reversed while still providing the optically labeled packets according to the invention.

The receiver 150 preferably includes an erbium-doped fiber amplifier 160 (EDFA) as an optical pre-amplifier. An optical filter 161 is preferably provided after the amplifier 160 to reduce the penalty from amplified-spontaneous-emission (ASE) noise. The amplified signal is then preferably separated into two paths 165, 166. One path 165 transmits the received signal to a DPSK receiver 190. The DPSK receiver 190 preferably comprises a one-bit delay interferometer 192, a balanced detector 194, and a differential RF amplifier 196 for detection of the DPSK payload (i.e., the DPSK modulated portion or component of the optically labeled packet). The other path 166 transmits the received signal to an ASK detector 198 for detection of the packet label (i.e., the ASK modulated portion or component of the optically labeled packet).

The optical delay interferometer 192 of the DPSK receiver 190 divides the light on path 165 into two arms and delays one arm by about one-bit period. It can be understood by those skilled in the art that the delay provided by the delay interferometer 192 can vary from precisely one-bit period while still providing sufficient delay to allow reception of the payload portion of received packets. Preferably, the delay provided by the delay interferometer 192 is between about 0.8 and about 1.2 times the bit period.

Figure 6:
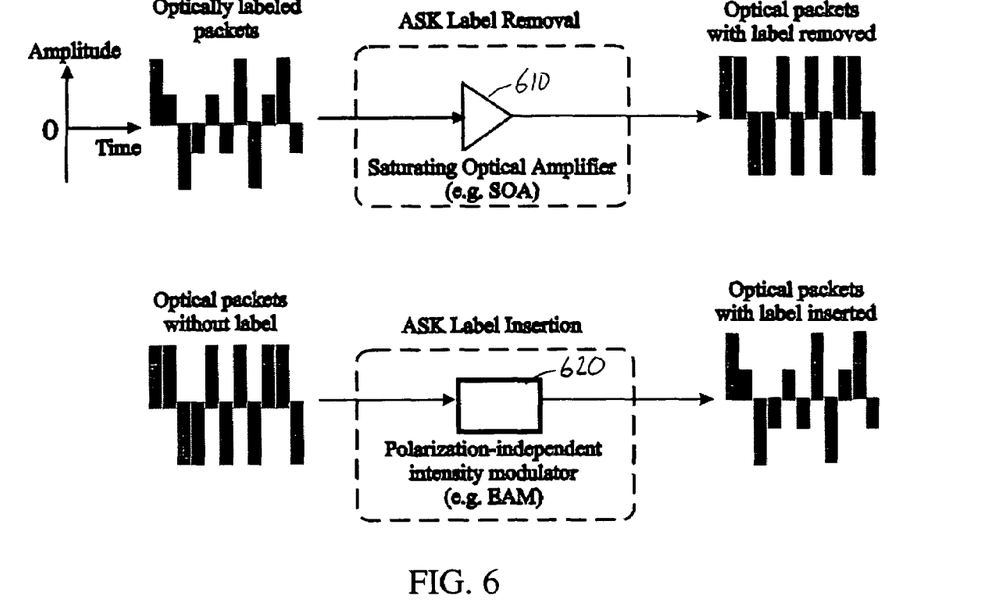
FIG. 6 is a schematic diagram illustrating label removal and insertion in accordance with embodiments of the invention.

In another preferred embodiment of a system according to the invention, a label processing device (not shown) is provided to provide label reading, label insertion, and/or label removal. FIG. 6 illustrates label removal and insertion according to preferred embodiments of the invention.

Figure 7:
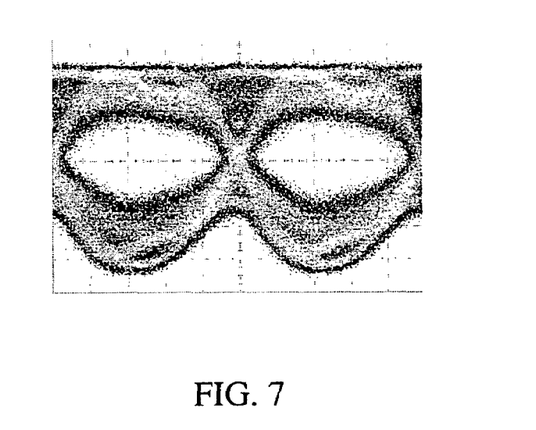
FIG. 7 is the received DPSK electrical eye diagram with label removal by a saturating SOA for optically labeled packet transmission in accordance with one embodiment of the invention.

In a device that provides label removal a chirp-free saturating amplifier 610 with a speed similar to (or faster than) the label data rate is preferably used. Such an amplifier may be a relatively simple and compact semiconductor optical amplifier (SOA), a fiber Raman amplifier, or the like. FIG. 7 shows a DPSK eye diagram with the ASK label removed using a saturating SOA.

For label insertion a low-speed intensity modulator 620 (e.g., a MZM or an EAM) may be used. The intensity modulator is preferably polarization-independent since the polarization of the signal is varying with time and location. As compared to prior art ASK/DPSK schemes where packet label data is phase-modulated, the label removal and insertion in accordance with the present invention are substantially simplified.

Figure 8:
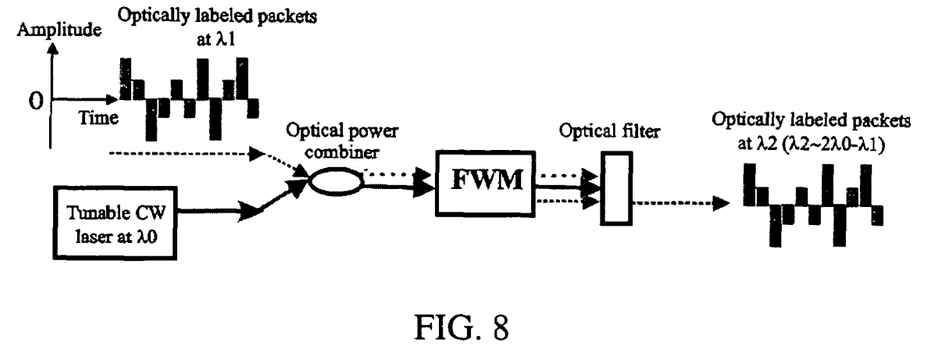
FIG. 8 is a schematic diagram illustrating payload/label-preserving wavelength conversion of optically labeled packets with DPSK/ASK modulation in accordance with an embodiment of the invention.

For wavelength conversion, as is typically required in core routers, phase-maintaining 4-wave-mixing (FWM) processes may be employed in accordance with the present invention. The FWM processes can be realized, for example, in a highly-nonlinear fiber or a fast SOA. FIG. 8 illustrates wavelength conversion of DPSK/ASK packets in accordance with a preferred embodiment of the invention. Both the amplitude and phase of the optical packets are preferably preserved. As shown in FIG. 8, optically-labeled DPSK/ASK packets at wavelength $\lambda 1$ are passed through the FWM medium together with pump light at wavelength $\lambda 0$. New packets at wavelength $\lambda 2$ with $\lambda 2 \sim 2\lambda 0 - \lambda 1$ are generated (through the FWM process), and carry the same payload and label information as the original packets.

Figure 2:
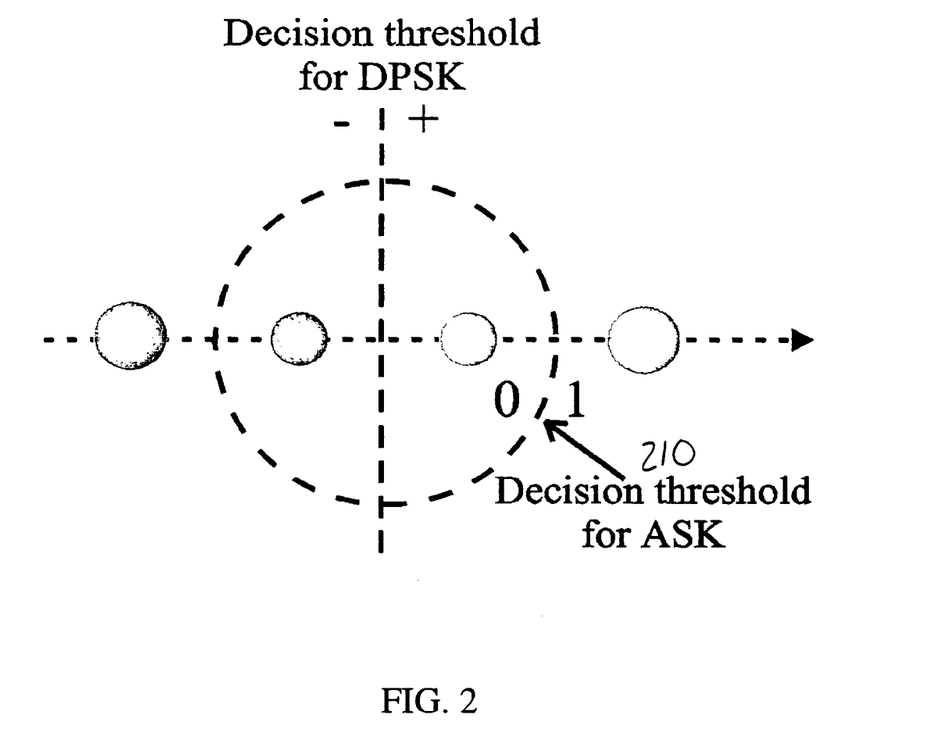
FIG. 2 is a plot illustrating a constellation diagram of DPSK payload and ASK label symbols.

FIG. 2 is a plot illustrating the constellation diagram of the payload and label symbols in a phasor diagram. In the diagram, the x-axis represents the real part of the optical field, and the y-axis represents the imaginary part of the optical field. The DPSK payload data 113 may be recovered at the receiver 150 by setting the decision threshold at the y-axis to compare the signs (or the phases) of adjacent bits. Such recovery of the DPSK payload data can be realized by using a delay interferometer 192 and a balanced detector 194, as discussed above and setting the decision threshold at 0. For example, if two adjacent bits have the same (or opposite) sign, then "1" (or "–1") is determined. The ASK label data can be retrieved by setting the decision threshold at the circle 210 with a radius that is the mean of the larger and smaller amplitude of the symbols.

An embodiment of the invention has been demonstrated experimentally with a 10-Gb/s payload signal and 2.5-Gb/s label signal. The laser used was a tunable laser operating at 1550 nm. The payload data at 10-Gb/s was added onto the laser light by modulating a MZM which was biased at null and driven at $2V_\pi$ to achieve phase modulation. An intensity modulator was used to insert label information at 2.5-Gb/s on the DPSK signal from the MZM by ASK modulation with 6-dB ER. The ER of the intensity modulation was set to allow approximately equal receiver sensitivity for the payload and label with the label data rate of ¼ of the payload data rate. The low ER was achieved by under-driving MZM at about $0.8V_\pi$ and shifting the bias point away from the quadrature point by about $0.1\ V_\pi$.

To simplify the DPSK/ASK transmitter an integrated 2-stage X-cut (chirp-free) modulator with 10-GHz bandwidth and 5.5-dB total insertion loss was used. At the receiver, an EDFA with approximately 4.5 dB NF was used as an optical pre-amplifier. The optical filter after the pre-amplifier had a 3-dB bandwidth of about 100-GHz. The amplified signal was separated into two paths, one entering a DPSK receiver comprising a 100-ps delay interferometer, a balanced detector, and a differential RF amplifier for payload detection, and the other entering an ASK detector for label detection.

Figure 3:
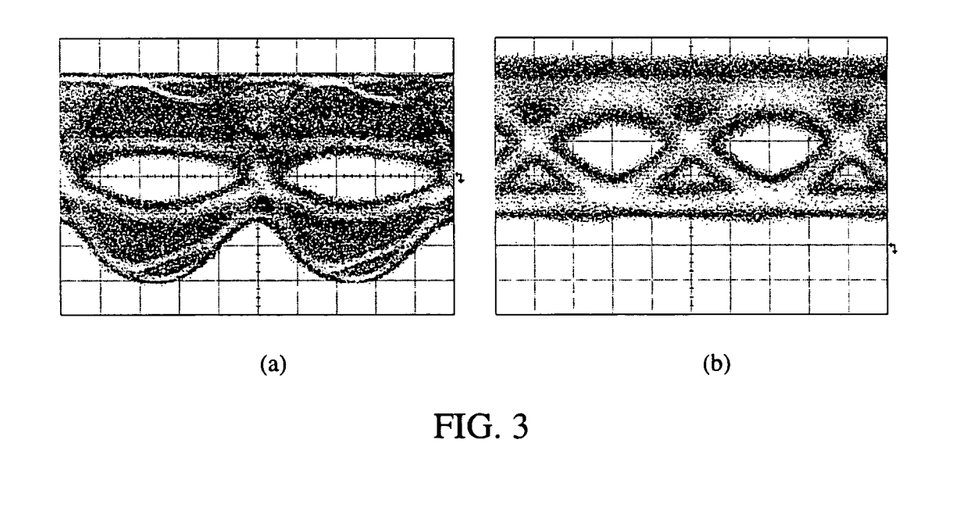
FIGS. 3*a-b* are received electrical DPSK and ASK eye diagrams for optically labeled packet transmission in accordance with one embodiment of the invention.

FIGS. 3*a*-*b* show eye diagrams detected at the DPSK receiver and ASK receiver (with a 1.5-GHz Bessel filter) with a continuous DPSK/ASK data stream. For detection of the DPSK payload portion of a received signal with a balanced detector, an optimum decision level was about 0.

For ASK label detection, the "0" level is about ¼ of "1" level since the ER of the ASK modulator is about 6 dB. For improved receiver sensitivity, the 1.5-GHz Bessel filter was used to reduce the intensity fluctuations at the phase transitions in DPSK data and to limit electrical noise.

Figure 4:
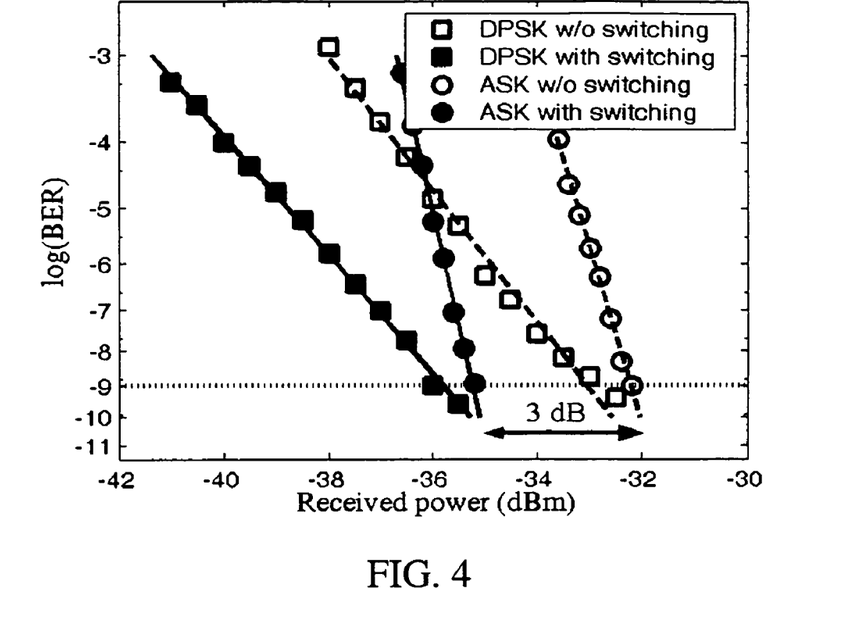
FIG. 4 is a plot showing the measured BER performance of a system according to an embodiment of the invention.

FIGS. 4a-b are plots obtained from the experimental demonstration, which show the dependence of BER on the received optical power (before the pre-amplifier). The patterns used in the experimental demonstration were $2^7-1$ PRBS for the DPSK payload data and $2^9-1$ PRBS for the ASK label data. A receiver sensitivity of better than −32 dBm was achieved for both payload and the label. It was determined that the DPSK performance degrades much slower than the ASK performance as power decreases, due to the fixed decision level for DPSK with balanced detection. It is understood that the label bit rate can be lowered (e.g., to about 155 Mb/s) if desired, and the overall receiver sensitivity can then be further improved.

Figure 5:
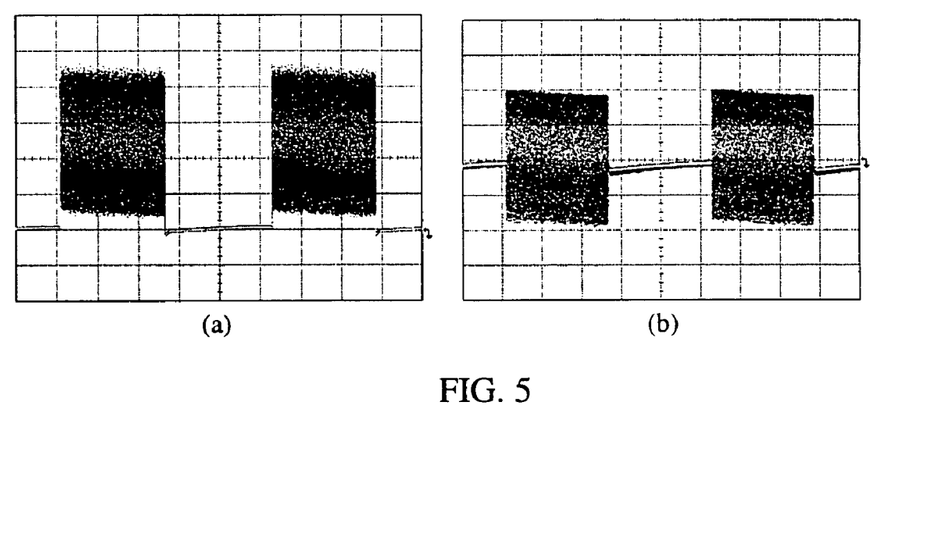
FIGS. 5*a-b* are scope traces of a periodically switched signal measured after a label receiver and at a payload receiver.

Further experimentation was performed to emulate a system having a switched labeled signal. A packet envelope generator 130 and an EAM 131 were used for switching on and off the DPSK/ASK signal from the transmitter 100 to form optical packets. It can be understood by those skilled in the art that the packet envelope generator 130 and the EAM 131 are not necessary to generate optically labeled packets according to the invention. The transmitter 110 can be adapted to generate packets at the transmitter 110 by, for example, turning off the payload and label signals driving the modulators 114, 120 and changing the bias voltage of the intensity modulator 120. FIGS. 5a-b show scope traces of transmitted packets measured after the ASK receiver and DPSK receiver.

To assess the dispersion tolerance, a 25-km SSMF (D=17 ps/km/nm) was inserted between the transmitter and the receiver, and a power penalty of less than about 1 dB was found for the 10-Gb/s payload, and no penalty for the 2.5-Gb/s label. The experimental demonstration is described in detail in a paper submitted to ECOC'03 by X. Liu et al., entitled "Optical-Label Switching Based On DPSK/ASK Modulation Format With Balanced Detection For DPSK Payload", which is incorporated herein by reference.

Although the present invention has been described in accordance with the embodiments shown, one skilled in the art will readily recognize that there could be variations to the embodiments, and that those variations would be within the spirit and scope of the present invention as defined by the appended claims.

We claim:

1. An optical transmitter for generating optically labeled packets comprising:
   a phase modulator driven by a payload signal to provide DPSK modulation of a payload portion of optically labeled packets; and
   an intensity modulator coupled to the phase modulator, the intensity modulator being driven by a label signal to provide ASK modulation of a label portion of optically labeled packets;
   wherein said payload signal is at a higher speed than said label signal.

2. The transmitter of claim 1 wherein the phase modulator and the intensity modulator are modulators selected from the group consisting of a Mach-Zehnder modulator, a single-wavelength modulator or an electro-absorption modulator.

3. The transmitter of claim 1 wherein the payload signal is a high speed signal having a data rate of greater than about 2.5 Gb/s and the label signal is a low speed signal having a data rate of less than about ¼ of the data rate of the payload signal.

4. The transmitter of claim 1 wherein the extinction ratio of the ASK modulation is between about 2 dB and about 8 dB.

5. The transmitter of claim 1 further comprising a differential encoder coupled to a phase modulator.

6. A system comprising:
   a transmitter for generating optically labeled packets, the transmitter including
      a phase modulator driven by a payload signal to provide DPSK modulation of a payload portion of the optically labeled packets; and
      an intensity modulator coupled to the phase modulator, the intensity modulator being driven by a label signal to provide ASK modulation of a label portion of the optically labeled packets;
   wherein said payload signal is at a higher speed than said label signal.

7. The system of claim 6 further comprising a receiver including a balanced detector for detection of the DPSK modulated payload portion of the optically labeled packets.

8. The system of claim 6 further comprising a wavelength converter for providing wavelength conversion of the optically labeled packets using a four-wave mixing process while maintaining the phase and amplitude of the optically labeled packets.

9. The system of claim 6 farther comprising means provide label insertion, label removal and/or label reading.

10. A system for transmission of optically labeled packets comprising:
    a transmitter including:
       a phase modulator driven by a payload signal to provide DPSK modulation of a payload portion of optically labeled packets; and
       an intensity modulator coupled to the phase modulator, the intensity modulator being driven by a label signal to provide ASK modulation of a label portion of optically labeled packets; and
    a receiver in optical communication with said transmitter, said receiver including a balanced detector for detection of the payload portion of the optically labeled packets;
    wherein said payload portion is at a higher speed than said label portion.

11. A communication method for transmission of optically labeled packets comprising the step of:
    generating DPSK modulation of a payload portion of optically labeled packets through the effect of a phase modulator driven by a payload signal; and
    generating ASK modulation of a label portion of optically labeled packets through the effect of an intensity modulator driven by a label signal, said intensity modulator being coupled to the phase modulator
    wherein said payload information is at a higher speed than said label information.

12. The method of claim 11 further comprising receiving the optically labeled packets using a balanced detector to detect the payload portion of the optically labeled packets.

13. The method of claim 11 wherein modulating the light from the laser source is performed using a phase modulator and an intensity modulator, the modulators selected from the group consisting of a Mach-Zehnder modulator, a single-wavelength modulator or an electro-absorption modulator.

14. The method of claim 11 wherein the payload of the optically labeled packets contains high speed data at a data rate of greater than about 2.5 Gb/s, and the label contains low speed data at a data rate of less than about ¼ of the data rate of the payload.

15. The method of claim 11 wherein the extinction ratio of the ASK modulation is between about 2 dB and about 8 dB.

16. An optical transmitter comprising:
a first modulator means driven by a payload signal to provide DPSK modulation of a payload portion of optically labeled packets; and
a second modulator means coupled to the first modulator means, the second modulator means being driven by a label signal to provide ASK modulation of a label portion of optically labeled packets;
wherein said payload signal is at a higher speed than said label signal.

17. A communication system for transmission of optically labeled packets comprising:
means for DPSK modulating a payload portion of optically labeled packets wherein said DPSK modulating means is driven by a payload signal; and
means for ASK modulating a label portion of the optically labeled packets wherein said ASK modulating means is driven by a label signal;
wherein said payload information is at a higher speed than said label information.

* * * * *